US012594620B2

(12) United States Patent

Fleck et al.

(10) Patent No.: US 12,594,620 B2
(45) Date of Patent: Apr. 7, 2026

(54) INSTRUMENTED TOOL HANDLER FOR FRICTION STIR WELDING

(71) Applicant: Mazak Corporation, Florence, KY (US)

(72) Inventors: Rodney Dale Fleck, Draper, UT (US); Russell J. Steel, Salem, UT (US)

(73) Assignee: Mazak Corporation, Florence, KY (US)

( * ) Notice: Subject to any disclaimer, the term of this patent is extended or adjusted under 35 U.S.C. 154(b) by 0 days.

(21) Appl. No.: 18/732,179

(22) Filed: Jun. 3, 2024

(65) Prior Publication Data

US 2024/0399492 A1      Dec. 5, 2024

Related U.S. Application Data

(63) Continuation of application No. 17/471,766, filed on Sep. 10, 2021, now Pat. No. 12,011,776, which is a continuation of application No. 16/115,188, filed on Aug. 28, 2018, now Pat. No. 11,130,192.

(60) Provisional application No. 62/552,199, filed on Aug. 30, 2017.

(51) Int. Cl.
B23K 20/12          (2006.01)
B23K 9/095          (2006.01)

(52) U.S. Cl.
CPC ........ B23K 20/1255 (2013.01); B23K 20/122 (2013.01); B23K 20/123 (2013.01); B23K 20/1235 (2013.01); B23K 20/126 (2013.01); B23K 9/0956 (2013.01)

(58) Field of Classification Search
None
See application file for complete search history.

(56) References Cited

U.S. PATENT DOCUMENTS

| | | | |
|---|---|---|---|
| 6,499,649 | B2 | 12/2002 | Sayama |
| 6,516,992 | B1 | 2/2003 | Colligan |
| 6,648,206 | B2 | 11/2003 | Nelson |
| 6,732,901 | B2 | 5/2004 | Nelson |
| 6,779,704 | B2 | 8/2004 | Nelson |
| 7,124,929 | B2 | 10/2006 | Nelson |

(Continued)

FOREIGN PATENT DOCUMENTS

| | | | | |
|---|---|---|---|---|
| CN | 105921877 A | * | 9/2016 | ......... B23K 20/1245 |
| DE | 102005032170 | | 1/2007 | |

(Continued)

OTHER PUBLICATIONS

U.S. Appl. No. 16/401,907, filed May 2, 2019, Liu Qingyuan.

(Continued)

*Primary Examiner* — Devang R Patel
(74) *Attorney, Agent, or Firm* — Fitch, Even, Tabin & Flannery LLP

(57) ABSTRACT

A friction stir welding (FSW) tool includes a head, a tool holder and a body between the head and the tool holder and attached to the head and the tool holder. The body may include a plurality of cooling fins. An interior of the body may include a pressure sensor, a temperature sensor, a torque sensor, and a communication node in electronic communication with the pressure sensor, the temperature sensor, and the torque sensor. The communication node may be in Bluetooth communication with a computing device.

12 Claims, 4 Drawing Sheets

(56) References Cited

U.S. PATENT DOCUMENTS

| | | | |
|---|---|---|---|
| 7,152,776 | B2 | 12/2006 | Nelson |
| 7,225,968 | B2 | 6/2007 | Packer |
| 7,234,625 | B2 | 6/2007 | Loitz |
| 7,270,257 | B2 | 9/2007 | Steel |
| 7,494,040 | B2 | 2/2009 | Babb |
| 7,530,486 | B2 | 5/2009 | Flak |
| 7,608,296 | B2 | 10/2009 | Packer |
| 7,651,018 | B2 | 1/2010 | Packer |
| 7,661,572 | B2 | 2/2010 | Nelson |
| 7,753,252 | B2 | 7/2010 | Taylor |
| 7,845,545 | B2 | 12/2010 | Packer |
| 7,909,231 | B2 | 3/2011 | Babb |
| 7,992,759 | B2 | 8/2011 | Steel |
| 7,993,575 | B2 | 8/2011 | Nelson |
| 8,011,560 | B2 | 9/2011 | Chen |
| 8,056,797 | B2 | 11/2011 | Packer |
| 8,157,154 | B2 | 4/2012 | Packer |
| 8,186,561 | B2 | 5/2012 | Allen |
| 8,191,753 | B2 | 6/2012 | Fleming |
| 8,241,556 | B2 | 8/2012 | Rosal |
| 8,302,834 | B2 | 11/2012 | Nelson |
| 8,317,080 | B2 | 11/2012 | Kingston |
| 8,469,256 | B2 | 6/2013 | Babb |
| 8,490,855 | B2 | 7/2013 | Kingston |
| 8,550,326 | B2 | 10/2013 | Packer |
| 8,910,851 | B2 | 12/2014 | Rosal |
| 8,955,734 | B2 | 2/2015 | Steel |
| 9,061,370 | B2 | 6/2015 | Nelson |
| 9,061,371 | B2 | 6/2015 | Higgins |
| 9,242,308 | B2 | 1/2016 | Peterson |
| 9,352,425 | B2 | 5/2016 | Rosal |
| 9,468,990 | B2 | 10/2016 | Osikowicz |
| 9,764,375 | B2 | 9/2017 | Miles |
| 10,421,150 | B2 | 9/2019 | Odakura |
| 11,130,192 | B2 | 9/2021 | Fleck |
| 11,821,790 | B2 | 11/2023 | Miguel Sánchez |
| 12,011,776 | B2 | 6/2024 | Fleck |
| 12,392,030 | B2 | 8/2025 | Bjormander |
| 2003/0075584 | A1 | 4/2003 | Sarik |
| 2005/0006439 | A1 | 1/2005 | Packer |
| 2005/0051602 | A1 | 3/2005 | Babb |
| 2005/0142005 | A1 | 6/2005 | Traylor |
| 2006/0032333 | A1 | 2/2006 | Steel |
| 2006/0032891 | A1 | 2/2006 | Flak |
| 2006/0049234 | A1 | 3/2006 | Flak |
| 2006/0157531 | A1 | 7/2006 | Packer |
| 2006/0175382 | A1 | 8/2006 | Packer |
| 2007/0187465 | A1 | 8/2007 | Eyre |
| 2007/0228104 | A1 | 10/2007 | Mankus |
| 2008/0029578 | A1 | 2/2008 | Steel |
| 2009/0294514 | A1 | 12/2009 | Babb |
| 2010/0071961 | A1 | 3/2010 | Steel |
| 2010/0078224 | A1 | 4/2010 | Steel |
| 2011/0127311 | A1 | 6/2011 | Peterson |
| 2011/0172802 | A1 | 7/2011 | Babb |
| 2012/0055977 | A1 | 3/2012 | Steel |
| 2012/0227546 | A1 | 9/2012 | Allen |
| 2012/0273555 | A1 | 11/2012 | Flak |
| 2013/0062395 | A1 | 3/2013 | Nelson |
| 2013/0206818 | A1 | 8/2013 | Higgins |
| 2013/0228612 | A1 | 9/2013 | Higgins |
| 2013/0299561 | A1 | 11/2013 | Higgins |
| 2014/0008418 | A1 | 1/2014 | Steel |
| 2014/0151438 | A1 | 6/2014 | Fleck |
| 2014/0207274 | A1 | 7/2014 | Ross |
| 2015/0258628 | A1 | 9/2015 | Flak |
| 2016/0045971 | A1 | 2/2016 | Holverson |
| 2017/0197274 | A1 | 7/2017 | Steel |
| 2017/0216961 | A1 | 8/2017 | Utter |
| 2018/0099349 | A1 | 4/2018 | Packer |
| 2018/0193943 | A1 | 7/2018 | Weigl |
| 2019/0061046 | A1 | 2/2019 | Fleck |
| 2019/0061048 | A1 | 2/2019 | Fleck |
| 2019/0151982 | A1 | 5/2019 | Rosal |
| 2019/0337087 | A1 | 11/2019 | Liu |
| 2019/0344380 | A1 | 11/2019 | Miles |

FOREIGN PATENT DOCUMENTS

| | | |
|---|---|---|
| DE | 102005032170 A1 | 1/2007 |
| DE | 202007009465 | 8/2008 |
| JP | 2002066763 | 3/2002 |
| JP | 2004532446 | 10/2004 |
| JP | 2006239778 | 9/2006 |
| JP | 2007268667 | 10/2007 |
| JP | 2013057615 | 3/2013 |
| JP | 2013126678 | 6/2013 |
| JP | 2015512338 | 4/2015 |
| JP | 2017035702 | 2/2017 |
| JP | 2017056490 | 3/2017 |
| JP | 2017512658 | 5/2017 |
| JP | 2017170525 | 9/2017 |
| KR | 20130094473 | 8/2013 |
| WO | 2015154744 | 10/2015 |
| WO | 2017025078 | 2/2017 |

OTHER PUBLICATIONS

U.S. Appl. No. 16/407,353, filed May 9, 2019, Miles Michael P.

Aschenback, Bernd, "Entwicklung einer Online-Prozesskontrolle für das Rührreibschweißen auf der Basis einer werkzeugintegrierten Sensorik", Dec. 31, 2012, XP055546420, Retrieved from the Internet: URL:http://www.gfenet.de/wcms/DocsID/3121195E8E41EBD6C1257D64002302E6/$file/Ruhrrebschweißen.pdf, and English translation.

Bjorkman, Gerald W et al., "Tool for Friction Stir Tracking of Welding Aluminum Alloys—Tech Briefs," Manufacturing & Prototyping, Mar. 1, 2003, 2 pages.

Communication pursuant to Article 94(3) EPC issued in related European Patent Application No. 18191104.1, mailed May 4, 2022, 4 pages.

Communication under Rule 71(3) EPC issued in related European Patent Application No. 18191104.1 , issued Dec. 2, 2021, 32 pages.

Extended European Search Report issued in corresponding European Patent Application No. 18191104.1 , issued Feb. 4, 2019, 12 pages.

Li et al., "Temperature measurement and control of bobbin tool FSW", Inter. Jour. Adv. Manufac. Technology, Dec. 2015, p. 337-346 (Year: 2015).

Luhn, Thomas "Prozessdiagnose und Prozessüberwachung beim Rührreibschweißen", Dec. 31, 2012, p. 30, XP055546443, Berlin, ISBN: 978-3-86386-963-2.

Notice of Reasons for Refusal, issued in related Japanese Patent Application No. 2018-160496, dated Oct. 4, 2022, 5 pages.

Search Report by Registered Search Organization, issued in related Japanese Patent Application No. 2018-160496, dated Aug. 30, 2022, 20 pages.

U.S. Appl. No. 60/573,703, filed May 24, 2014, 6 pages.

\* cited by examiner

344

452

INSTRUMENTED TOOL HANDLER FOR FRICTION STIR WELDING

CROSS-REFERENCE TO RELATED APPLICATIONS

This application is a continuation of U.S. patent application Ser. No. 17/471,766, filed Sep. 10, 2021, which is a continuation of U.S. patent application Ser. No. 16/115,188, filed on Aug. 28, 2018, now issued as U.S. Pat. No. 11,130,192, which claims the benefit of U.S. Provisional Patent Application No. 62/552,199, filed on Aug. 30, 2017, which are hereby incorporated by reference in their entireties.

BACKGROUND

Friction stir welding (FSW) plasticizes a piece of metal by rotating a FSW tool against the piece of metal. Friction and pressure from the FSW tool may heat up the piece of metal such that the metal is plasticized, and then the FSW tool is inserted into the piece of metal. If two pieces of metal are being welded together, the FSW tool may be placed at the joint, and both pieces of metal may be plasticized, the pieces of metal joining by the mixing of the plasticized portions of each of the two pieces of metal.

SUMMARY

In some embodiments, a friction stir welding (FSW) tool includes a head, a tool holder and a body between the head and the tool holder and attached to the head and the tool holder. In some embodiments, the body may include a plurality of cooling fins. An interior of the body may include a pressure sensor, a temperature sensor, a torque sensor, and a communication node in electronic communication with the pressure sensor, the temperature sensor, and the torque sensor. The communication node may be in Bluetooth communication with a computing device.

In other embodiments, a system for friction stir welding may include a computing device with a proportional-integral-derivative (PID) controller and a friction stir welding tool including a head, a tool holder, and a body between the head and the tool holder. The body may include a plurality of cooling fins. An interior of the body may include a pressure sensor, a temperature sensor, a torque sensor, and a communication node in electronic communication with the pressure sensor, the temperature sensor, the torque sensor, the computing device, and the PID controller.

In still other embodiments, a method of measuring while friction stir welding includes rotating a friction stir welding tool. The method may include measuring pressure on a head of a friction stir welding tool using a pressure sensor, measuring temperature of a body of the friction stir welding tool, and measuring torque of the friction stir welding tool using a torque sensor. The method may include transmitting the measured pressure, the measured temperature, and the measured torque to a computing device using a communication node.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a cross-sectional view of the embodiment of FIG. 1-1 of the FSW tool;

FIG. 2 is an embodiment of a network diagram for measuring and transmitting data while friction stir welding;

DETAILED DESCRIPTION

This disclosure generally relates to devices, systems, and methods for a friction stir welding (FSW) tool that measures FSW information near the head of the tool. More specifically, at least one embodiment of the disclosure relates to devices, systems, and methods for a FSW tool that can be used in a Computer Numerical Control (CNC) machine.

Figure 1:
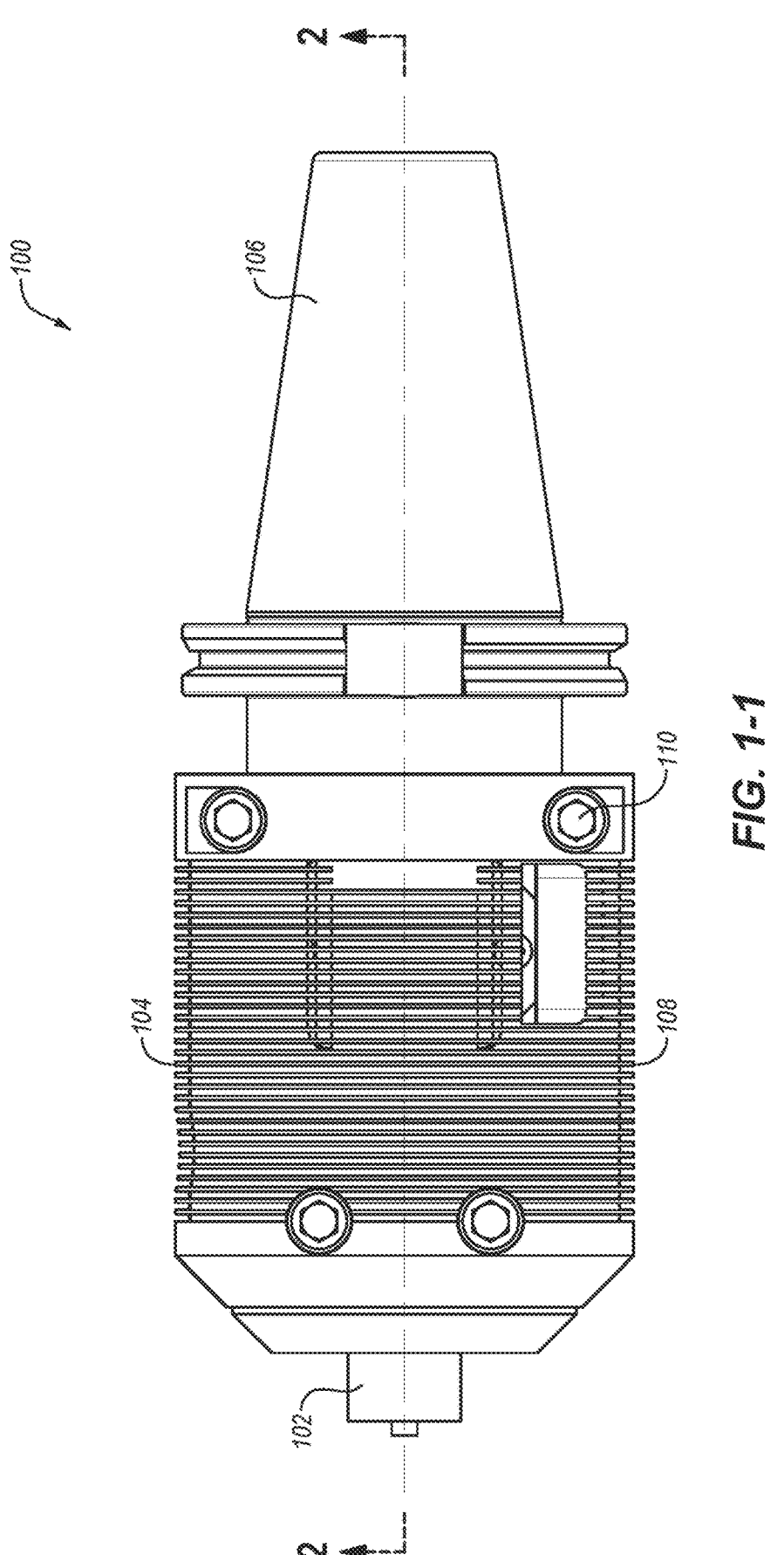
FIG. 1-1 is a side view of an embodiment of a FSW tool.

Referring to FIG. 1-1, in some embodiments, an FSW tool 100 may include a head 102, a body 104, and a tool holder 106. In some embodiments, the tool holder 106 may be a CAT tool holder, such as a CAT 30, CAT 40, CAT 50, CAT 60, or other CAT tool holder. In other embodiments, the tool holder 106 may be a BT tool holder, such as a BT 30, BT 40, BT 50, or other BT tool holder. In further embodiments, other CNC machine compatible tool holders may be used.

In some embodiments, the body 104 may include a plurality of cooling fins 108. During FSW, heat is generated on the head 102. The heat generated on the head 102 may be transferred to the body 104. The heat on the body 104 may then be transferred to at least one of a plurality of cooling fins 108. In some embodiments, the plurality of cooling fins 108 may be circumscribed around an outer circumference of the body 104. In some embodiments, a cooling fin 108 may completely circumscribe the outer circumference of the body 104. In other words, the cooling fin 108 may be continuous around an outer surface of the body 104. In other embodiments, a cooling fin 108 may partially circumscribe, or be partially continuous around, the outer circumference of the body 104. For example, connectors 110 connecting two halves of the body 104 may break the continuity of a cooling fin 108. In some embodiments, the body 104 may include cooling fins 108 that both completely circumscribe the body 104 and cooling fins 108 that partially circumscribe the body 104. In some embodiments, an entirety of the body 104 may include cooling fins 108. In other embodiments, a portion of the body 104 may include cooling fins.

Heat transferred to the plurality of cooling fins 108 may be diffused using conductive media cooling. In some embodiments, the conductive media may be air, such that the cooling fins 108 cool the FSW tool 100 by air cooling. In other embodiments, the conductive media may be any other conductive media used in conductive media cooling. In at least one embodiment, as the FSW tool 100 rotates, air (e.g., a column or vortex of air) surrounds the FSW tool 100. The air may pass over the cooling fins 108, and the cooling fins 108 may transfer heat to the air, thereby air-cooling the cooling fins 108. As the cooling fins 108 are air-cooled, the body 104 may transfer additional heat to the cooling fins 108. As the body 104 transfers heat to the cooling fins 108, the head 102 may transfer heat to the body 104. Thus, the FSW tool 100 may be air-cooled.

In some embodiments, the head 102 may be cylindrical. In other embodiments, the head 102 may be pyramidal. In still other embodiments, the head 102 may be conical. In yet other embodiments, the head 102 may include other shapes. In some embodiments, the head 102 may include threads. The threads may be wound opposite the direction of rotation of the FSW tool 100. In other embodiments, the threads may be wound in the same direction of rotation of the FSW tool 100. In some embodiments, the head 102 may include any FSW head.

Figures 1, 2:
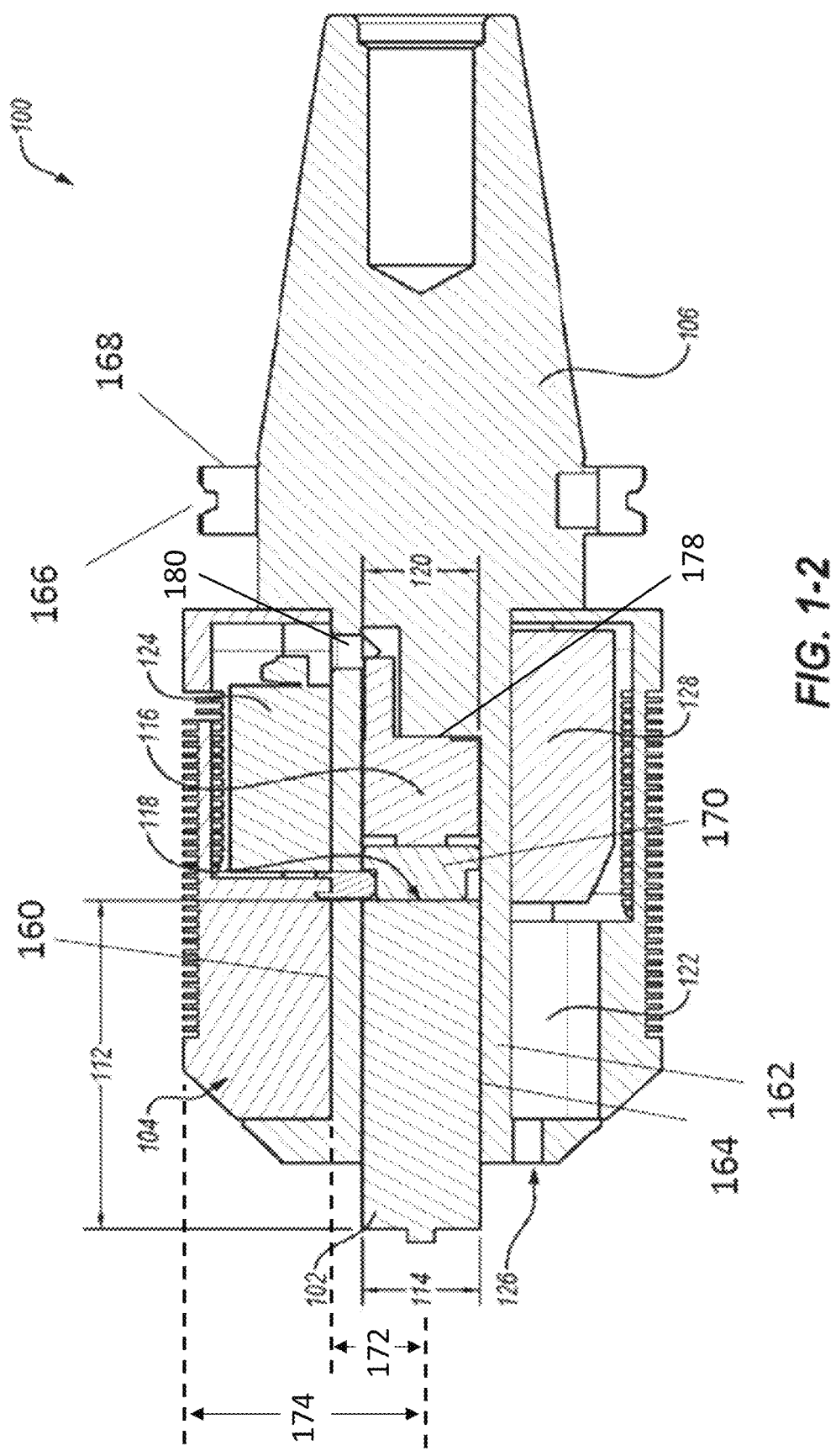
Figure 2:
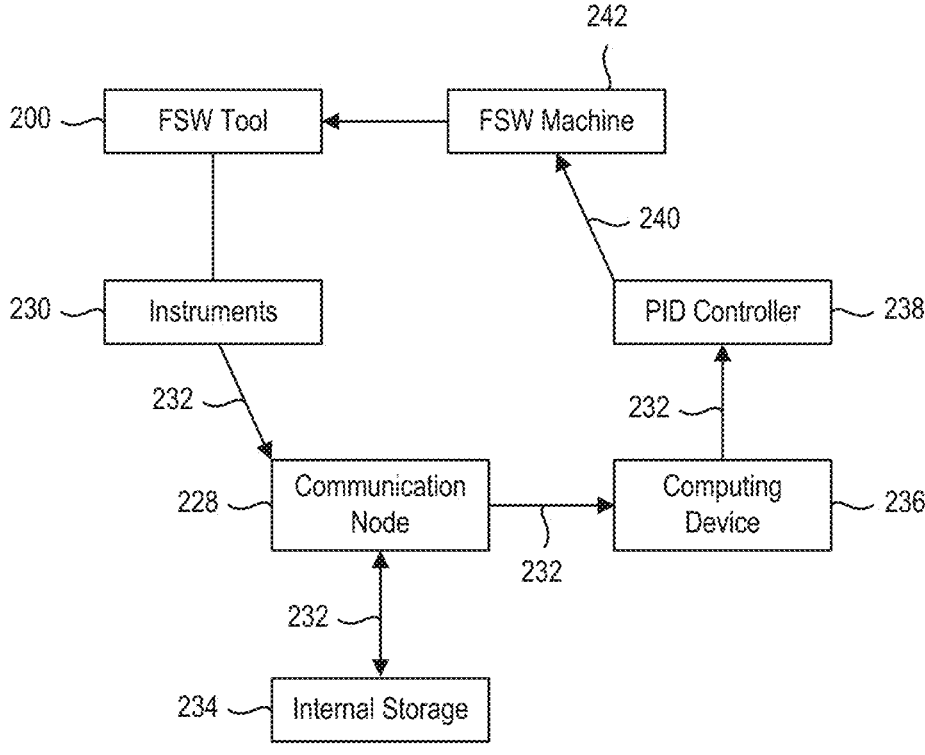

FIG. 1-2 is a cross-sectional view of the FSW tool 100 of FIG. 1-1. In some embodiments, the head 102 may be at least partially inserted inside the body 104. The head 102 has a head length 112. In some embodiments, the head length 112 may be in a range having an upper value, a lower value, or upper and lower values including any of 6.0 millimeters, 13 millimeters, 25 millimeters, 50 millimeters, 100 millimeters, 150 millimeters, 200 millimeters, 250 millimeters, 300 millimeters, or any value therebetween. For example, the head length 112 may be greater than 6.0 millimeters. In other examples, the head length 112 may be less than 200 millimeters. In yet other examples, the head length 112 may be in a range of 6.0 millimeters to 300 millimeters. In some embodiments, the head 102 may include a head adapter. The head adapter may interface with the head 102 and the tool holder 106 to extend the length of the head 102.

The head 102 has a head diameter 114. In some embodiments, the head diameter 114 may be in a range having an upper value, a lower value, or upper and lower values including any of 4 millimeters, 10 millimeters, 14 millimeters, 20 millimeters, 25 millimeters, 25.4 millimeters, 30 millimeters, 35 millimeters, 38 millimeters, 40 millimeters, 45 millimeters, 50 millimeters, or any value therebetween. For example, the head diameter 114 may be greater than 10 millimeters. In other examples, the head diameter 114 may be less than 50 millimeters. In yet other examples, the head diameter 114 may be in a range of 10 millimeters to 50 millimeters. In some embodiments, the head 102 may include collets to increase the head diameter 114 between pre-manufactured heads 102.

In some embodiments, a pressure sensor 116 may be installed at the base 118 of the head 102. In some embodiments, the pressure sensor 116 may contact the head 102 at the base 118. In other words, the pressure sensor 116 may be immediately adjacent to, abut, or directly abut the head 102. For example, pressure from the head 102 may be transferred directly to the pressure sensor 116. In another example, the pressure transferred from the head 102 to the pressure sensor 116 may be within 5% of the actual pressure on the head 102. The pressure sensor 116 has a pressure sensor diameter 120. In some embodiments, the pressure sensor diameter 120 may be the same as the head diameter 114. In embodiments where the pressure sensor 116 has the same diameter as the head 102, more accurate measurements may be provided than a pressure sensor 116 that is larger or smaller than the head 102. In other embodiments the pressure sensor 116 may be larger than the head 102. In still other embodiments, the pressure sensor 116 may be smaller than the head 102. In some embodiments, the pressure sensor 116 may be shaped to match a profile of the head 102.

In some embodiments, the pressure sensor 116 may be a piezoresistive strain gauge. In other embodiments, the pressure sensor 116 may be a piezoelectric pressure sensor. In still other embodiments, the pressure sensor 116 may be a Wheatstone bridge. It yet other embodiments, the pressure sensor 116 may be a fluid pressure transducer. In further embodiments, the pressure sensor 116 may be any other pressure sensor. In still further embodiments, the pressure sensor 116 may be a load sensor.

The pressure sensor 116 has a load capacity. The load capacity is the load above which the pressure sensor 116 may be damaged and/or no longer provide accurate and reliable measurements. In some embodiments, the load capacity may be in a range having an upper value, a lower value, or upper and lower values including any of 0.25 kilonewton (kN), 0.5 kN, 1.0 kN, 2.5 kN, 5.0 kN, 7.5 kN, 15 kN, 30 kN, 60 kN, 150 kN, 300 kN, or any value therebetween. For example, the load capacity may be greater than 0.25 kN. In other examples, the load capacity may be less than 300 kN. In yet other examples, the load capacity may be between 0.25 kN and 300 kN, or between 5.0 kN and 60 kN.

In some embodiments, the body 104 may surround at least a portion of the tool holder 106. In some embodiments, an interior of the body 104 may house a plurality of instruments. For example, the interior of the body 104 may house one or more of the pressure sensor 116, a temperature sensor 122, and a torque sensor 124. In some embodiments, each instrument of the plurality of instruments may be located behind the base 118 of the head 102. A spacer 170 may be provided axially intermediate the pressure sensor 116 and the head 102. In other embodiments, the plurality of instruments may be located inside the body 104 between the head 102 and the tool holder 106. In some embodiments, at least one of the temperature sensor 122 and/or the torque sensor 124 may be located between a shoulder 126 of the body 104 and the base 118. In one embodiment, the body 104 is a sleeve. The body 104 has a through opening 160. The body 104 extends about the tool holder 106. In one embodiment, the body 104 has a radially inner surface portion adjacent the tool holder 106 and a radially outer surface portion opposite the radially inner surface portion. The radially inner surface portion of the body 104 is at a first radial distance 172 from an axis around which the tool holder 106 rotates and the radially outer surface portion of the body 104 is at a second radial distance 174 from the axis. The tool holder 106 has a tubular wall 162, a bore 164, a seating surface portion 178, and at least one through aperture 180. The pressure sensor 116 is received in the bore 164 of the tool holder 106. In one embodiment, the tool holder 106 has a flange 168 with a toolholder groove 166.

Positioning the plurality of instruments as close as possible to the head may provide more accurate data than placing the plurality of instruments in the motor or rotary machine. In other words, collecting measurements as close to the head 102 as possible may reduce the amount of noise, feedback, extraneous information, or combinations thereof that may be collected closer to the motor or rotary machine.

In some embodiments, the temperature sensor 122 may be a thermocouple. In other embodiments, the temperature sensor 122 may be a laser. In still other embodiments, the temperature sensor may be an infrared camera. The temperature sensor 122 has a temperature sensor capacity. The temperature sensor capacity is the temperature above which the temperature sensor may no longer provide accurate and/or reliable measurements. In some embodiments, the temperature sensor capacity may be in a range having an upper value, a lower value, or upper and lower values including any of 0° C., 100° C., 200° C., 300° C., 400° C., 500° C., 600° C., 700° C., 800° C., 900° C., 1,000° C., 1,100° C., 1,200° C., 1,300° C., 1,400° C., 1,500° C., or any value therebetween. For example, the temperature sensor capacity may be greater than 0° C. In other examples, the temperature sensor capacity may be less than 1,500° C. In yet other examples, the temperature sensor capacity may be in a range of 0° C. to 1,500° C.

In some embodiments, the torque sensor 124 may be a strain gauge or a plurality of strain gauges designed to measure both static and dynamic torque. For example, the torque sensor 124 may be installed in a collar bolted on the outside of the tool holder. In other embodiments, the torque sensor 124 may be an accelerometer. The torque sensor 124 has a torque sensor capacity. The torque sensor capacity is the torque above which the torque sensor may be damaged and/or no longer provide accurate and reliable measurements. In some embodiments, the torque sensor capacity may be in a range having an upper value, a lower value, or upper and lower values including any of 50 newton-meters (N-m), 100 N-m, 250 N-m, 500 N-m, 1,000 N-m, 2,000 N-m, 3,000 N-m, 4,000 N-m, 5,000 N-m, 6,000 N-m, 7,000 N-m, or any value therebetween. For example, the torque sensor capacity may be greater than 50 N-m. In other examples, the torque sensor capacity may be less than 7,000 N-m. In yet other examples, the torque sensor capacity may be in a range of 50 N-m to 7,000 N-m.

In some embodiments, the body may include a communication node 128 having a communication device. In some embodiments, the communication node 128 may be in electronic communication with one or more of the pressure sensor 116, the temperature sensor 122, and the torque sensor 124. In some embodiments, the communication node 128, the pressure sensor 116, and the torque sensor 124 may have an electronics and instrumentation temperature capacity. The electronics and instrumentation temperature capacity is the temperature above which the communication node 128, the pressure sensor 116, and the torque sensor 124 may be damaged from excessive heat. In some embodiments, the electronics and instrumentation temperature capacity may be in a range having an upper value, a lower value, or upper and lower values including any of 0° C., 100° C., 200° C., 300° C., 400° C., 500° C., 600° C., 700° C., 800° C., 900° C., 1,000° C., or any value therebetween. For example, the electronics and instrumentation temperature capacity may be greater than 0° C. In other examples, the electronics and instrumentation temperature capacity may be less than 1,000° C. In yet other examples, the electronics and instrumentation temperature capacity may be in a range of 0° C. to 1,000° C.

In some embodiments, the communication node 128 may have a plurality of communication channels. For example, the communication node 128 may have 1, 2, 3, 4, 5, 6, 7, 8, 16, 32, 64, or more channels of analog input. Information from the channels of analog input may be transmitted to a computing device. Information collected and transmitted by the channels of analog input may include one or more of temperature, torque, and pressure, measured from one or more of the temperature sensor 122, the torque sensor 124, and the pressure sensor 116.

In some embodiments, the communication node 128 may transmit information wirelessly. For example, the communication node 128 may transmit information on an FM frequency. The FM frequency may have a range of up to 2 kilometers. In other embodiments, the communication node 128 may transmit information via Bluetooth, ZigBee, Z-wave, 802.11x protocols, or other wireless communications.

In some embodiments, one or more of the pressure sensor 116, the temperature sensor 122, the torque sensor 124 and the communication node 128 may be powered using induction power. In some embodiments, a collar may surround the body during operation of the FSW tool 100. The collar may include a first wire coiled around an inner circumference of the collar. A second wire may be coiled in the body 104. Electric current may be passed through the first wire, creating an electromagnetic field inside the collar. The second wire may generate an electric current from the electromagnetic field. The electric current from the electromagnetic field may provide the power for one or more of the pressure sensor 116, the temperature sensor 122, the torque sensor 124, and the communication node 128. In other embodiments, power may be supplied to one or more components through an internal power source, such as a battery. In some embodiments, the internal power source may be a rechargeable power source. In further embodiments, one or more components may be powered by induction power and one or more other components may be powered by a battery that is not in electrical communication with the induction power source.

FIG. 2 is a network diagram of the controls for an FSW tool 200. The FSW tool 200 includes a plurality of instruments 230. The plurality of instruments 230 may transmit measured data 232 to a communication node 228. In some embodiments, the communication node 228 may include an internal storage 234. The measured data 232 may be stored in the internal storage 234. In this manner, the FSW tool may perform as a logging-while-welding tool. In some embodiments, the measured data 232 may be stored in an internal storage cache before being transmitted to the computing device 236. In other embodiments, the measured data 232 may be passed through the communication node 228 to the computing device 236 without being stored in the internal storage.

In some embodiments, the computing device 236 may include a proportional-integral-derivative (PID) controller 238. The PID controller 238 may be in communication with the communication node. In some embodiments, the PID controller 238 may compare the measured data 232 to stored data. In response to the comparison, the PID controller 238 may issue a command 240 to the FSW machine. The command 240 may be, for example, to change a welding parameter, such as pressure applied to the FSW tool 200 (e.g., plunge rate) and/or rotational velocity of the FSW tool 200.

For example, the PID controller 238 may compare measured pressure with an optimal pressure stored in a memory of the computing device. The optimal pressure is the pressure at which FSW is the most effective. If the measured pressure is greater than the optimal pressure, then the PID controller 238 may issue a command 240 to a FSW machine 242 (e.g., a CNC machine) to reduce downward pressure on the FSW tool 200 (e.g., by decreasing the plunge rate). If the measured pressure is less than the optimal pressure, then the PID controller 238 may issue a command 240 to the FSW machine 242 to increase downward pressure on the FSW tool 200 (e.g., by increasing the plunge rate).

In some embodiments, the optimal pressure may be in a range having an upper value, a lower value, or upper and lower values including any of 1 gigapascals (GPa), 2 GPa, 4 GPa, 6 GPa, 8 GPa, 10 GPa, 12 GPa, 14 GPa, 16 GPa, 18 GPa, 20 GPa, 22 GPa, 24 GPa, 26 GPa, or any value therebetween. For example, the optimal pressure may be greater than 1 GPa. In other examples, the optimal pressure may be less than 26 GPa. In yet other examples, the optimal pressure may be in a range of 1 GPa to 26 GPa.

In other examples, the PID controller 238 may compare a measured load with an optimal load. The optimal load is the load at which FSW is the most effective. If the measured load is greater than the optimal load, then the PID controller 238 may issue a command 240 to a FSW machine 242 (e.g., a CNC machine) to reduce downward pressure on the FSW tool 200 (e.g., by decreasing the plunge rate). If the measured load is less than the optimal load, then the PID controller 238 may issue a command 240 to the FSW machine 242 to increase downward pressure on the FSW tool 200 (e.g., by increasing the plunge rate).

In some embodiments, the optimal load may be in a range having an upper value, a lower value, or upper and lower values including any of 0.25 kN, 0.5 kN, 1.0 kN, 2.5 kN, 5.0 kN, 7.5 kN, 15 kN, 30 kN, 60 kN, 150 kN, 300 kN, or any value therebetween. For example, the optimal load may be greater than 0.25 kN. In other examples, the optimal load may be less than 300 kN. In yet other examples, the optimal load may be in a range of 0.25 kN to 300 kN.

In other examples, the PID controller 238 may compare measured torque with an optimal torque stored in a memory of the computing device. The optimal torque is the torque at which FSW is most effective for the conditions. If the measured torque is greater than the optimal torque, then the PID controller 238 may issue a command 240 to the FSW machine 242 to reduce the downward pressure and/or rotational velocity of the FSW tool 200. If the measured torque is less than the optimal torque, then the PID controller 238 may issue a command 240 to the FSW machine 242 to increase downward pressure and/or rotational velocity of the FSW tool 200. In some embodiments, optimal values may include a tolerance band. The tolerance band may be in a range having a lower value, an upper value, or lower and upper values including any of 0.1%, 0.5%, 1.0%, 2.0% 5.0%, 10%, or any value therebetween. For example, the tolerance band may be greater than 0.1%. In other examples, the tolerance band may be less than 10%. In yet other examples, the tolerance band may be in a range of 0.1% to 5%.

In some embodiments, the tolerance band may be dependent on the materials and geometries being welded. For example, a narrower tolerance band for temperature may be used for materials with a high heat capacity, such as steel, or for thick sections of material that may absorb more heat. In other examples, a wide tolerance band for pressure and/or torque may be used for softer materials, such as aluminum, or for thinner sections of materials that are more susceptible changes in pressure and torque.

In some embodiments, one measurement may be the primary measurement, and the other two measurements may be leading indicators of the primary measurement. For example, temperature may be the primary measurement, and pressure and torque may be leading indicators that may indicate when a deviation from the optimal temperature may be near. In other examples, pressure may be the primary measurement, and temperature and torque may be the leading indicators. In still other examples, torque may be the primary measurement, and temperature and pressure may be the leading indicators.

In some embodiments, the optimal torque may be in a range having an upper value, a lower value, or upper and lower values including any of 1 newton-meters (N-m), 10 N-m, 500 N-m, 750 N-m, 1,000 N-m, 1,500 N-m, or any value therebetween. For example, the optimal torque may be greater than 5 N-m. In other examples, the optimal torque may be less than 1,500 N-m. In yet other examples, the optimal torque may be in a range of 1 N-m to 1,500 N-m.

In still other examples, the PID controller 238 may compare measured temperature with an optimal temperature stored in a memory of the computing device. The optimal temperature is the temperature at which FSW is most effective. If the measured temperature is greater than the optimal temperature (or above the tolerance band, if included, for optimal temperature), then the PID controller 238 may issue a command 240 to the FSW machine 242 to reduce the downward pressure and/or rotational velocity of the FSW tool 200. If the measured temperature is less than the optimal temperature (or below the tolerance band, if included, for optimal temperature), then the PID controller 238 may issue a command 240 to the FSW machine 242 to increase downward pressure and/or rotational velocity of the FSW tool 200.

In some embodiments, the optimal temperature may be in a range having an upper value, a lower value, or upper and lower values including any of 0° C., 100° C., 200° C., 300° C., 400° C., 500° C., 600° C., 700° C., 800° C., 900° C., 1,000° C., 1,100° C., 1,200° C., 1,300° C., 1,400° C., 1,500° C., or any value therebetween. For example, the optimal temperature may be greater than 0° C. In other examples, the optimal temperature may be less than 1,500° C. In yet other examples, the optimal temperature may be in a range of 0° C. to 1,500° C. In some examples, for FSW of two pieces of 6061 aluminum, an optimal temperature may be 300° C., an optimal torque may be 70 N-m, and an optimal pressure may be 4.5 kN. In some embodiments, any or each of the optimal values for FSW joining of two 2061 aluminum pieces may be varied by 10%, 20%, or more. In other examples, for FSW carbon steel to tool steel, an optimal temperature may be 800° C., an optimal torque may be 400 N-m, and an optimal pressure may be 115 kN. In some embodiments, any or each of the optimal values for FSW joining of carbon and tool steel may be varied by 10%, 20%, or more.

Figure 3:
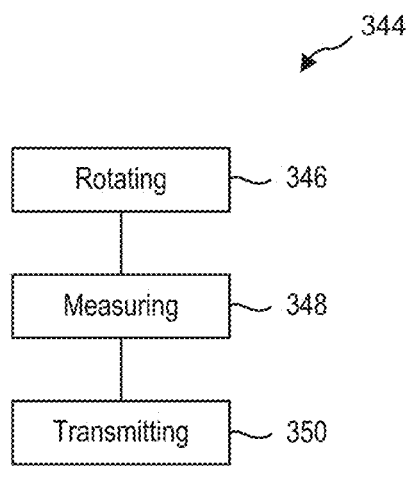
FIG. 3 is an embodiment of a method for measuring while friction stir welding.

FIG. 3 is an embodiment of a method 344 of method of measuring while friction stir welding. The method 344 may include rotating 346 a FSW tool. Rotating 346 has a maximum rotational velocity. In some embodiments, the maximum rotational velocity may be in a range having an upper value, a lower value, or upper and lower values including any of 9,000 rotations per minute (RPM), 10,000 RPM, 12,000 RPM, 14,000 RPM, 16,000 RPM, 18,000 RPM, 20,000 RPM, 22,000 RPM, 24,000 RPM, 26,000 RPM, 28,000 RPM, 30,000 RPM, or any value therebetween. For example, the maximum rotational velocity may be greater than 9,000 RPM. In other examples, the maximum rotational velocity may be less than 30,000 RPM. In yet other examples, the maximum rotational velocity may be in a range of 9,000 RPM to 30,000 RPM.

In some embodiments, the method 344 may include the act of measuring 348 the state of the FSW tool. For example, the method 344 may include measuring 348 pressure on a head of the FSW tool using a pressure sensor (e.g., a load cell). The method 344 may include measuring 348 temperature of a body of the FSW tool using a temperature sensor.

The method 344 may include measuring 348 torque of the FSW tool using a torque. In some embodiments, the method 344 may include any combination of measuring 348 pressure, temperature, and torque. In some embodiments, other states of the FSW tool may be measured 348.

In some embodiments, the method 344 may include transmitting 350 the measured 348 information to a computing device. In some embodiments, transmitting 350 the information may include transmitting 350 via wireless communication (e.g., via FM radio transmission, Bluetooth, Zigbee, Z-wave, 802.11x wireless protocols, or other wireless communication protocols). In other embodiments, transmitting 350 the information may include transmitting 350 using a wired connection. In further embodiments, transmitting the information may include transmitting 350 by any type of transmission.

Figure 4:
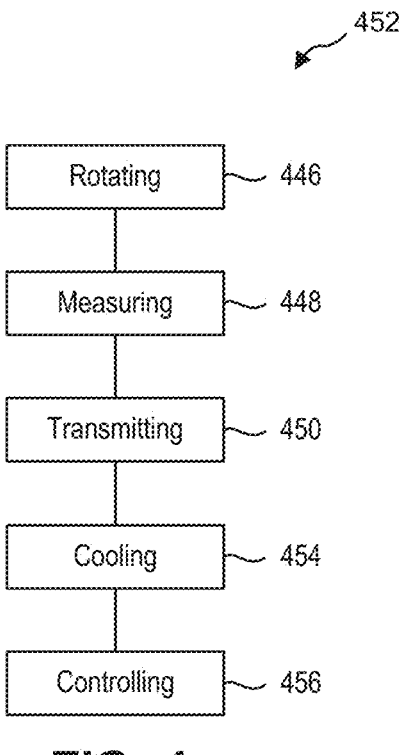
FIG. 4 is another embodiment of a method for measuring while friction stir welding.

FIG. 4 is another embodiment of a method 452 of measuring while friction stir welding. In some embodiments, the method 452 may include the same or similar acts of rotating 446, measuring 448, and transmitting 450, as described in relation to FIG. 3. In some embodiments, the method 452 may include cooling 454 a body of a FSW tool. The body may include a plurality of cooling fins on an exterior of the body. Heat may be transmitted to the fins, and as the tool rotates, the fins may be cooled 454 by radiating heat into the surrounding air.

In some embodiments, the FSW tool may include a memory. In some embodiments, the communication node may record the measured pressure, the measured temperature, and the measured torque on the memory. In some embodiments, the pressure sensor, the temperature sensor, and the torque sensor may record directly on the memory. The communication node may then transmit the measured information from the memory.

In some embodiments, the method 452 may include controlling 456 the FSW tool using a PID controller. The PID controller may be in communication with the communication node. The communication node may communicate the measured 448 information to the PID controller. In some embodiments, the PID controller may have a memory. The memory may include, for a given FSW regime, an optimal pressure for FSW, an optimal temperature for FSW, an optimal torque for FSW, tolerance bands for one or more values, or combinations thereof. The PID controller may compare measured values against the optimal values (and associated tolerance bands, in some embodiments), and adjust the pressure and/or rotational velocity of the FSW tool to improve FSW performance. Controlling 456 using the PID controller may include any or each of the acts described in relation to FIG. 3, which is incorporated herein.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An apparatus comprising:
a tool holder rotatable about an axis;
an upper machine tool connector portion of the tool holder configured to connect to a machine tool;
a central bore of the tool holder having a lower opening to receive a head for friction stirring a workpiece, the tool holder configured to support the head in the central bore as the machine tool urges the head downwardly against the workpiece and rotates the head to cause the head to friction stir the workpiece;

a load sensor in the central bore of the tool holder between the tool holder and the head along the axis with the head received in the central bore, the load sensor rotatable with the tool holder;

a spacer in the central bore between the load sensor and the head along the axis and directly contacting the load sensor and the head with the head received in the central bore, the spacer configured to be urged upwardly and engaged with the load sensor as the machine tool urges the head downwardly against the workpiece, the spacer rotatable with the tool holder;

the load sensor configured to detect a vertical load between the head and the workpiece via the engagement between the spacer and the load sensor as the machine tool urges the head downwardly against the workpiece;

a temperature sensor rotatable with the tool holder; and a communication node rotatable with the tool holder and operatively connected to the load sensor and the temperature sensor, the communication node operable to wirelessly communicate load sensor data and temperature sensor data.

2. The apparatus of claim 1 wherein the lower opening of the central bore is configured to receive the head in a proximal direction into the central bore;

wherein the tool holder includes a surface portion extending transverse to the axis and configured to engage a main body portion of the load sensor and resist proximal movement of the load sensor.

3. The apparatus of claim 1 wherein the lower opening of the central bore is configured to receive the head in a proximal direction into the central bore;

wherein the tool holder includes a surface portion extending transverse to the axis and configured to resist movement of the load sensor in the proximal direction beyond a predetermined axial position of the load sensor in the central bore.

4. The apparatus of claim 1 wherein the tool holder includes a load sensor seating portion extending transverse to the axis across the central bore to support the load sensor in the central bore.

5. The apparatus of claim 1 in combination with the head, the head configured to friction stir a metallic workpiece.

6. An apparatus comprising:

a tool holder rotatable about an axis;

a machine tool connector portion of the tool holder configured to connect to a machine tool;

a central bore of the tool holder to receive a head;

a load sensor in the central bore of the tool holder between the tool holder and the head along the axis with the head received in the central bore, the load sensor rotatable with the tool holder;

a spacer in the central bore between the load sensor and the head along the axis with the head received in the central bore, the spacer rotatable with the tool holder;

a temperature sensor rotatable with the tool holder; and a communication node rotatable with the tool holder and operatively connected to the load sensor and the temperature sensor, the communication node operable to wirelessly communicate load sensor data and temperature sensor data; and an induction coil rotatable with the tool holder, the induction coil operable to provide electric current as the tool holder rotates.

7. The apparatus of claim 6 wherein the induction coil is operatively connected to the load sensor, communication node, or both the load sensor and the communication node.

8. An apparatus comprising:

a tool holder rotatable about an axis;

a machine tool connector portion of the tool holder configured to connect to a machine tool;

a central bore of the tool holder to receive a head;

a load sensor in the central bore of the tool holder between the tool holder and the head along the axis with the head received in the central bore, the load sensor rotatable with the tool holder;

a spacer in the central bore between the load sensor and the head along the axis with the head received in the central bore, the spacer rotatable with the tool holder;

a temperature sensor rotatable with the tool holder;

a communication node rotatable with the tool holder and operatively connected to the load sensor and the temperature sensor, the communication node operable to wirelessly communicate load sensor data and temperature sensor data; and a battery and an induction coil that are rotatable with the tool holder.

9. The apparatus of claim 8 wherein the battery and/or induction coil are operable to provide electrical current for the load sensor and/or communication node.

10. The apparatus of claim 1 further comprising a rechargeable power source for the load sensor and/or the communication node.

11. The apparatus of claim 1 further comprising an inductive coil rotatable with the tool holder, the apparatus in combination with an inductive power source operable to produce an electric current in the inductive coil of the tool holder.

12. The apparatus of claim 11 wherein the inductive coil is operably coupled to the load sensor.

* * * * *